(12) United States Patent
Kovach et al.

(10) Patent No.: US 10,251,325 B2
(45) Date of Patent: *Apr. 9, 2019

(54) VERTICAL TILLAGE SYSTEM

(71) Applicant: CNH Industrial America LLC, New Holland, PA (US)

(72) Inventors: Michael George Kovach, Morton, IL (US); Tracey Duane Meiners, Mackinaw, IL (US); Dean Alan Knobloch, Goodfield, IL (US); Gaylen James Kromminga, Morton, IL (US); Gregory S. Smart, Bettendorf, IA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/997,472

(22) Filed: Jun. 4, 2018

(65) Prior Publication Data

US 2018/0279537 A1  Oct. 4, 2018

Related U.S. Application Data

(63) Continuation of application No. 14/685,155, filed on Apr. 13, 2015, now Pat. No. 10,015,921, which is a (Continued)

(51) Int. Cl.
*A01B 49/02* (2006.01)
*A01B 5/04* (2006.01)
*A01B 29/04* (2006.01)

(52) U.S. Cl.
CPC .............. *A01B 49/027* (2013.01); *A01B 5/04* (2013.01); *A01B 29/048* (2013.01); *A01B 49/02* (2013.01); *Y10T 29/49448* (2015.01)

(58) Field of Classification Search
CPC ......... A01B 5/04; A01B 29/048; A01B 49/02; A01B 49/027
See application file for complete search history.

(56) References Cited

U.S. PATENT DOCUMENTS 323,343 A  7/1885  Dow
323,344 A  7/1885  Dow
(Continued)

FOREIGN PATENT DOCUMENTS

DE  10147595  4/2003
FR  2687534  8/1993
(Continued)

OTHER PUBLICATIONS

Great Plains Manufacturing, Inc. Operator's Manual, 2003.
(Continued)

*Primary Examiner* — Matthew D. Troutman
(74) *Attorney, Agent, or Firm* — Rebecca L. Henkel; Rickard K. DeMille

(57) ABSTRACT

A vertical tilling implement to be pulled behind and agricultural vehicle having a number of gangs of fluted-concave disc blades, rolling baskets, and wheels connected to a main frame. As the vertical tilling implement is pulled, the fluted-concave disc blades move the soil in a direction lateral to the side of the blades as well as up. Meanwhile, the rolling bars aid in leveling the seedbed and crushing the remaining large pieces of soil. The vertical tilling implement reduces the amount of subsoil compaction and cuts through heavy residue making it ideal for use in the fall or in the spring.

20 Claims, 4 Drawing Sheets

Related U.S. Application Data continuation of application No. 14/318,089, filed on Jun. 27, 2014, now Pat. No. 9,033,063, which is a continuation of application No. 13/928,144, filed on Jun. 26, 2013, now Pat. No. 8,770,310, which is a continuation of application No. 13/450,285, filed on Apr. 18, 2012, now Pat. No. 8,511,398, which is a continuation of application No. 13/293,549, filed on Nov. 10, 2011, now Pat. No. 8,302,700, which is a continuation of application No. 11/946,310, filed on Nov. 28, 2007, now Pat. No. 8,074,729.

(56) References Cited

U.S. PATENT DOCUMENTS

| | | |
|---|---|---|
| 395,787 A | 1/1889 | Knutzen |
| 488,779 A | 12/1892 | Spaulding et al. |
| 694,274 A | 2/1902 | Herold |
| 740,748 A | 10/1903 | Maurice |
| 792,294 A | 6/1905 | Scanljung |
| 1,088,075 A | 2/1914 | Johnson |
| 1,473,519 A | 11/1923 | Rolli |
| 1,611,358 A | 12/1926 | Miller |
| 1,894,474 A | 1/1933 | Sckowska |
| 2,818,008 A | 12/1957 | Fulper et al. |
| 3,085,634 A | 4/1963 | Hotchkiss, Jr. |
| 3,090,447 A | 5/1963 | Hotchkiss, Jr. |
| 3,090,448 A | 5/1963 | Hotchkiss, Jr. |
| 3,223,178 A | 12/1965 | Clifford et al. |
| 3,314,485 A | 4/1967 | Godbersen |
| 3,620,310 A | 11/1971 | Richey |
| 3,845,825 A | 11/1974 | Boone et al. |
| 3,878,901 A | 4/1975 | Robertson, Sr. |
| 3,949,813 A | 4/1976 | van der Lely |
| 4,044,842 A | 8/1977 | Worick |
| 4,047,574 A | 9/1977 | Foreman |
| 4,066,274 A | 1/1978 | Adee |
| 4,088,196 A | 5/1978 | van der Lely |
| 4,090,571 A | 5/1978 | van der Lely |
| 4,113,028 A | 9/1978 | Glueck |
| 4,127,178 A | 11/1978 | Blair |
| 4,173,260 A | 11/1979 | van der Lely et al. |
| 4,180,135 A | 12/1979 | Birkenback et al. |
| 4,187,916 A | 2/1980 | Harden et al. |
| 4,301,873 A | 11/1981 | Baxter |
| 4,361,191 A | 11/1982 | Landoll et al. |
| 4,407,371 A | 10/1983 | Hohl |
| 4,595,064 A | 6/1986 | Anderson |
| 4,600,060 A | 7/1986 | Winter |
| 4,650,006 A | 3/1987 | Reimann |
| 4,687,065 A | 8/1987 | Cope et al. |
| 4,785,891 A | 11/1988 | Noland |
| 4,790,389 A | 12/1988 | Adee et al. |
| 4,865,132 A | 9/1989 | Moore, Jr. |
| 5,474,135 A | 12/1995 | Schlagel |
| 5,632,343 A | 5/1997 | Gengler |
| 5,649,602 A | 7/1997 | Bruce |
| 5,797,460 A | 8/1998 | Parker et al. |
| 5,871,709 A | 2/1999 | Greis et al. |
| 5,873,417 A | 2/1999 | Halischuk |
| 5,881,820 A | 3/1999 | Baker |
| 5,957,217 A | 9/1999 | Gunnink |
| 6,068,061 A | 5/2000 | Smith et al. |
| 6,554,078 B1 | 4/2003 | McDonald |
| 6,557,646 B1 | 5/2003 | Hurtis et al. |
| 6,626,246 B2 | 9/2003 | Gerber et al. |
| 6,681,868 B2 | 1/2004 | Kovach et al. |
| 6,843,047 B2 | 1/2005 | Hurtis |
| 6,871,709 B2 | 3/2005 | Knobloch et al. |
| 6,912,963 B2 | 7/2005 | Bassett |
| 6,926,093 B1 | 8/2005 | Fink et al. |
| 6,935,435 B1 | 8/2005 | Shenk |
| 7,017,675 B2 | 3/2006 | Ankenman et al. |
| 7,143,837 B2 | 12/2006 | Dietrich, Sr. |
| D635,590 S | 4/2011 | Kovach et al. |
| 8,047,299 B2 | 11/2011 | Hurtis |
| 8,074,730 B2 | 12/2011 | Kovach et al. |
| D667,847 S | 9/2012 | Kovach |
| 8,302,700 B2 | 11/2012 | Kovach et al. |
| 2003/0085044 A1 | 5/2003 | McFarlane |
| 2003/0196823 A1 | 10/2003 | McDonald |
| 2004/0016554 A1 | 1/2004 | McDonald |
| 2006/0021769 A1 | 2/2006 | Ankenman et al. |
| 2007/0074645 A1 | 4/2007 | Kinkead et al. |
| 2008/0066935 A1 | 3/2008 | Backer et al. |
| 2008/0230243 A1 | 9/2008 | Evin |
| 2010/0084148 A1 | 4/2010 | Kovach et al. |
| 2010/0276166 A1 | 11/2010 | Kovach |
| 2010/0276167 A1 | 11/2010 | Kovach |
| 2012/0267129 A1 | 10/2012 | Kovach et al. |
| 2013/0299205 A1 | 11/2013 | Kovach et al. |
| 2014/0027134 A1 | 1/2014 | Kovach et al. |

FOREIGN PATENT DOCUMENTS

| | | |
|---|---|---|
| FR | 2851122 | 8/2004 |
| FR | 2862477 | 5/2005 |
| GB | 2345627 | 7/2000 |
| JP | 2003225003 | 8/2003 |
| WO | 2004034768 A1 | 4/2004 |
| WO | 2005077138 | 8/2005 |

OTHER PUBLICATIONS

AG Talk, Rolling Basket for IH 496 Disc, https://talk.newagtalk.com/forums/thread-view.asp?tid=31957&DisplayT . . . , Oct. 15, 2007.

"Ripper-Stripper™ Strip-till Subsoiler," Unverferth Manufacturing Company, Inc., 1998, 2 pgs.

"Heavy Duty Utility Coulter," Ausherman GP, Division of Great Plains Manufacturing, 1 pg.

"Series 1000," Sunflower Manufacturing, Co., Inc., Apr. 1989, 16 pgs.

"Tandem & Offset Disks," John Deere, Feb. 1997, 5 pgs.

"Disk Harrows," Case Corporation, 1996, 8 pgs.

"Primary Tillage Tools," Sunflower Manufacturing Co., Inc., Jul. 1999, 3 pgs.

"Series 4200," Sunflower, 2 pgs.

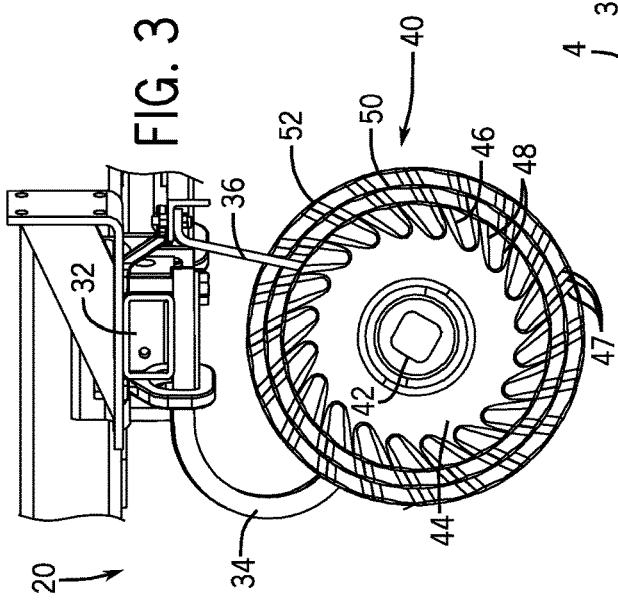
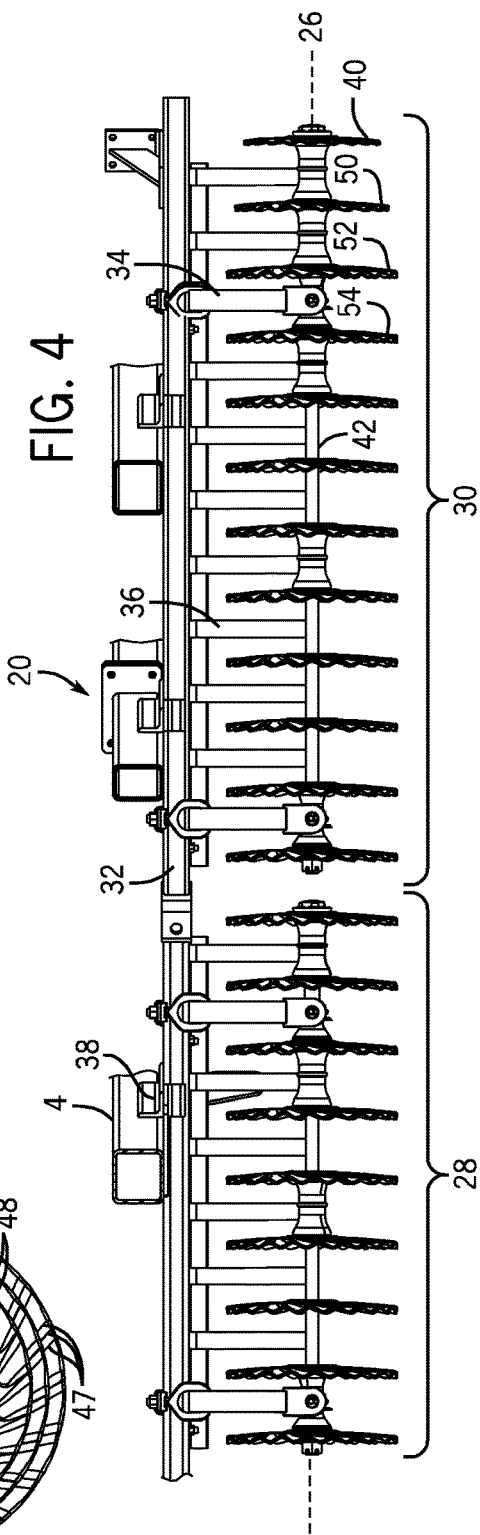

VERTICAL TILLAGE SYSTEM

CROSS REFERENCE TO RELATED APPLICATIONS

This application is a continuation of U.S. patent application Ser. No. 14/685,155, entitled "VERTICAL TILLAGE SYSTEM", filed Apr. 13, 2015, which is a continuation of U.S. patent application Ser. No. 14/318,089, entitled "VERTICAL TILLAGE SYSTEM", filed Jun. 27, 2014 (now U.S. Pat. No. 9,033,063), which is a continuation of U.S. patent application Ser. No. 13/928,144, entitled "VERTICAL TILLAGE SYSTEM", filed Jun. 26, 2013 (now U.S. Pat. No. 8,770,310), which is a continuation of U.S. patent application Ser. No. 13/450,285, entitled "VERTICAL TILLAGE SYSTEM", filed Apr. 18, 2012 (now U.S. Pat. No. 8,511,398), which is a continuation of U.S. patent application Ser. No. 13/293,549, entitled "VERTICAL TILLAGE SYSTEM", filed Nov. 10, 2011 (now U.S. Pat. No. 8,302,700), which is a continuation of U.S. patent application Ser. No. 11/946,310, entitled "VERTICAL TILLAGE SYSTEM", filed Nov. 28, 2007 (now U.S. Pat. No. 8,074,729). Each of the foregoing applications is hereby incorporated by reference in its entirety.

BACKGROUND

This invention relates to tillage implements and, in particular, to tillage implements utilizing rotary blades.

It is well known that to attain the best agricultural performance from a piece of land, a farmer must cultivate the soil, typically through a tilling operation. Common tilling operations include plowing, harrowing, and subsoiling. Modern farmers perform these tilling operations by pulling a tilling implement behind a motorized tractor. Depending on the crop selection and the soil conditions, a farmer may need to perform several tilling operations at different times over a crop cycle to properly cultivate the land to suit the crop choice.

In one type of tilling operation, rows or gangs of discs are pulled through soil at depths between 3 and 6 inches to break up clods or lumps of soil, as well as old plant material to (1) provide a more amenable soil structure for planting and (2) level the soil surface.

The configuration of the tilling implement gangs and their constituent discs will determine the quality and quantity of the passes required to effectively till an area of soil. For example, a gang of parallel flat discs pulled through the soil, oriented such that their axis of revolution is perpendicular to the direction of pull, will not be very effective at tilling the soil. To improve the tilling action, those skilled in the art have attempted to change the angle at which the gang is oriented. However, an increased gang angle can cause complications. The increased gang angle will leave large clods of soil that may require multiple passes to pulverize. Additionally, the side pressure of the soil against the sides of flat discs or discs having only a shallow concavity of 1.25 to 1.69 inches will often break the discs. To increase disc strength, the disc can be made to be more concave. However, increasing the concavity of the discs to improve their strength promotes the formation of an undesirable compaction layer.

Thus, tilling implements involving discs have a number of drawbacks. First, multiple passes of the tilling implement over the same area of soil may be required to properly cultivate the soil and cut through heavy crop residue. If multiple passes are required, then the farmer will incur increased costs associated with the amount of time and fuel required to prepare the seedbed. Known tilling implements are limited to speeds below approximately 6 miles per hour. Speeds in excess of approximately 6 miles per hour will vertically lift the tilling implement, resulting in the blades engaging the soil by less than 3 to 6 inches. If this occurs, the blades will not effectively till the soil or, if the blades are forced to remain in the soil, it can result in increased disc failure due to the increased pressure applied to the discs by the soil at greater velocities.

Second, existing cultivators compact the soil under the prepared seedbed. This layer of compacted soil inhibits plant germination, root growth, and crop yield. The presence of a compacted layer of soil may require an additional tillage operation such as plowing to break up the compacted earth in order to avoid the problems of poor water absorption and weak anchoring of crops in the ground.

Thus, there is a need for a tilling implement that is capable of thoroughly tilling the soil in a single pass and capable of traveling at greater speeds without excessive disc failure or the formation of a compaction layer.

BRIEF DESCRIPTION

The present invention overcomes the aforementioned drawbacks by providing a vertical tillage system incorporating fluted-concave disc blades. The present invention utilizes a fluted-concave disc blade, such as described in U.S. Pat. No. 5,649,602 or other fluted-concave disc blades and incorporated herein by reference, moving soil not only laterally, but also up and away from the subsoil layer. This movement of soil greatly reduces subsoil compaction. Additionally, the fluted-concave disc blade is capable of cutting through most heavy crop residue.

Another advantage is that unlike some other tilling systems, the present invention can be used for either fall or spring tilling. It creates a seedbed that is level and uniform and will not leave coulter slots that are susceptible to drying out. The vertical tilling system fills the long-felt need for a tilling implement that is capable of cutting dead plant material, preparing the soil for planting, and leveling the soil surface in one pass, without leaving a compacted soil layer.

In accordance with one aspect of the invention, a vertical tillage system is disclosed that includes a main frame extending from a rear end to a front end along a direction of travel when pulled by an agricultural vehicle. The vertical tillage system also includes at least two rows of fluted-concave disc blades supported by the main frame, the fluted-concave disc blades connected to the main frame through an axis to rotatably engage soil passing under the main frame at a desired tilling depth, each fluted-concave disc blade having a plurality of peaks and troughs formed about an outer periphery of the fluted-concave disc blade and extending inward from the outer periphery. Additionally, the vertical tillage system includes at least one member providing downward pressure. The members attached to the main frame at a position proximate to the rear end of the main frame relative to the position of the fluted-concave disc blades and exert a downward pressure that reduces and dampens the motion of the mainframe caused by the fluted-concave disc blades rotatably engaging the soil.

Furthermore, the vertical tillage system has a pair of wheels arranged proximate to the front end of the main frame and distal ends of at least one row of the fluted-concave disc blades to further reduce and dampen the motion of the mainframe caused by the fluted-concave disc blades rotatably engaging the soil.

Additionally, the pair of stabilizing wheels may be connected to the main frame through a pivot.

Also, the member that provides downward pressure includes a rolling basket.

Additionally, the rolling basket may include helically twisted bars.

Additionally, the rolling basket may include round bars.

Further still, one or more of the members may provide downward pressure includes an additional row of fluted-concave disc blades.

In addition, the rows of fluted-concave disc blades may be indexed.

Also, the fluted-concave disc blades may have varying diameters and the smallest diameters blades may be arranged at the distal ends of the rows.

Furthermore, one or more of the rows of fluted-concave disc blades may not be perpendicular to a centerline of the main frame.

Also, the rows of fluted-concave disc blades may include two or more rows arranged symmetrically about the centerline of the main frame.

Furthermore, the vertical tilling system may include at least one row that is oriented at an angle of about 18 degrees relative to a direction that is perpendicular to the direction of travel.

Also, the fluted-concave disc blades may have a concavity of 1.25 to 1.69 inches.

In accordance with another aspect of the invention, a system for tilling is disclosed that includes a main frame extending from a rear end to a front end along a direction of travel when pulled by an agricultural vehicle. The system also includes a plurality of indexed rows, each of the plurality of indexed rows having an axle with a plurality of fluted blades located along the axle, the plurality of indexed rows supported by and spatially arranged beneath the main frame such that when the tilling system is pulled by the agricultural vehicle it creates a tilling path. The system further includes an adjustable pressure assembly that is attached to the rear end of the main frame. The system also includes a rolling basket assembly connected to the adjustable pressure assembly, the rolling basket assembly extending downward to the tilling path. When pulled by the agricultural vehicle, the plurality of fluted blades rotate to till soil along a tilling path by moving the soil both away from the faces of the fluted-concave disc blades as well as kicking soil up behind the fluted-concave disc blades as they rotate and wherein the rolling basket assembly pulverizes and levels the soil.

Also, all of the indexed rows of fluted-concave disc blades may be spatially arranged such that all of the rotational axes of the rows of fluted-concave disc blades are perpendicular to the direction of travel of the tilling system.

Furthermore, the indexed rows of fluted-concave disc blades may be spatially arranged such that the rotational axis of at least one of the indexed rows of fluted-concave disc blades is not perpendicular to the direction of travel of the tilling system.

Additionally, the indexed rows of fluted-concave disc blades may be spatially arranged to form an x-shaped pattern.

Also, the indexed rows of fluted-concave disc blades may be spatially arranged to form a k-shaped pattern.

Further still, the indexed rows of fluted-concave disc blades may be spatially arranged to form a diamond-shaped pattern.

Also, the member providing downward pressure may be rolling baskets each having a rotational axis, at least two of the which are not collinear. However, these could be collinear.

In accordance with yet another aspect of the invention, a method for manufacturing a vertical tillage system is disclosed that includes the extending a main frame from a rear end to a front end along a direction of travel when pulled by an agricultural vehicle. The method also includes mounting at least two rows of fluted-concave disc blades to the main frame a plurality crests and troughs formed around an outer periphery of the fluted-concave disc blade and extending inward from the outer periphery and the fluted-concave disc blade connected to the main frame through a pivot axis to rotatably engage soil passing under the main frame at a desired tilling depth. Furthermore, the method includes mounting at least one member providing downward pressure to the main frame at a position proximate to the rear end of the main frame relative to the position of the fluted-concave disc blades and exerting a downward pressure configured to cause the fluted-concave disc blades to extend into the soil to the desired tilling depth and reduce and dampen the motion of the main frame caused by the fluted-concave disc blades rotatably engaging the soil.

Various other features of the present invention will be made apparent from the following detailed description of the drawings.

DRAWINGS

In the description, reference is made to the accompanying drawings which illustrate one embodiment of the invention where like elements share common designations.

FIG. 3 is a side elevational view of a row of fluted-concave disc blades;

FIG. 4 is a front elevational view of a row of fluted-concave disc blades;

DETAILED DESCRIPTION

Figure 1:
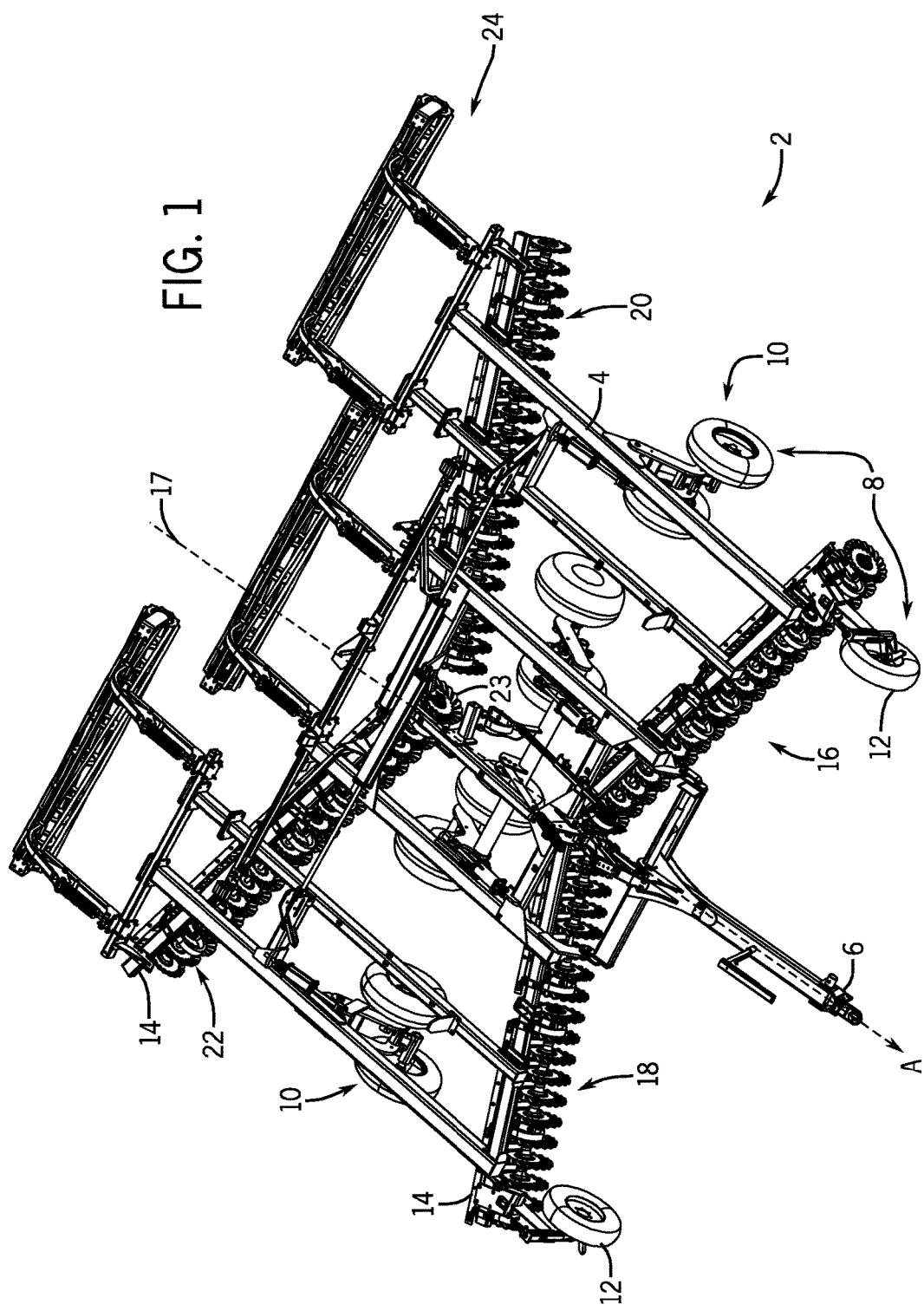
FIG. 1 is a perspective view of an embodiment of the present invention.

Referring to FIG. 1, a vertical tilling implement 2 is shown. An agricultural vehicle pulls the vertical tilling implement 2 in a direction of motion A. The vertical tilling implement 2 includes a main frame 4. The main frame 4 has a hitch 6 on the front end that may be used to connect the vertical tilling implement 2 to an agricultural vehicle such as a tractor. Additionally, a set of wheels 8 are connected to the main frame 4. The set of wheels 8 are oriented in a direction that is in general alignment with the direction of motion A. The set of wheels 8 includes a set of center wheels 10 and a set of pivoting wheels 12. The set of center wheels 10 is attached across the main frame 4 at positions, for example, roughly midway between the front and rear ends of the main frame 4. The set of center wheels 10 may include a system for adjusting the distance between the main frame 4 and the set of center wheels 10. This system for adjusting may permit the set of center wheels 10 to be statically fixed during the movement of the vertical tilling implement 2 or to be dynamically adjustable as the vertical tilling implement 2 travels. The set of pivoting wheels 12 are connected to the front distal ends of the main frame 4. As will be described, the set of pivoting wheels 12 may include at least two pivoting wheels that reduce the amount of lateral movement of vertical tilling implement 2 as it is pulled.

The vertical tilling implement 2 also includes a plurality of rows of fluted-concave disc blades 14 attached to the main frame 4. In accordance with one configuration, the plurality of rows of fluted-concave disc blades 14 are indexed. In particular, the plurality of rows of fluted-concave disc blades 14 includes a front left row 16, a front right row 18, a rear left row 20, and a rear right row 22. When indexed, the front left row 16 and the front right row 18 are aligned with the rear left row 20 and the rear right row 22 such that areas of ground between the blades in the front left rows 16 and the front right row 18 are engaged by the blades in the rear left row 20 and the rear right row 22 as the tilling implement is pulled forward.

The fluted-concave disc blades will induce lateral and vertical forces in the vertical tilling implement 2. The fluted-concave disc blades on the plurality of rows of fluted-concave disc blades 14 have surface features, as will be described below. The rotation of the fluted-concave disc blades and the engagement of the surface features of the blades will displace soil during the tilling operation. However, the engagement of the surface features of the blades with the soil will also apply a force to the blades. The blades engagement with the soil will displace the fluted-concave disc blades in a direction perpendicular to the blades direction of rotation. Moreover, if the vertical tilling system is pulled at high speed, it has a tendency to be forced upward and disengage the soil. In the aggregate, the engagement of the plurality of rows of fluted-concave disc blades 14 with the soil during the tilling operation will generate vertical and lateral forces on the main frame 4. When sufficiently strong, these vertical and lateral forces can create instability in the vertical tilling implement 2 as the vertical tilling implement 2 is pulled forward. As will be described, these pitfalls have been overcome in the present invention.

In the configuration shown in FIG. 1, the front left row 16 is symmetric about a centerline 17 of the vertical tilling implement 2 with the front right row 18. Likewise, the rear left row 20 is symmetric about the centerline 17 of the vertical tilling implement 2 with the rear right row 22. Additionally, the front left row 16 is substantially symmetric about a line perpendicular to the direction of motion A with the rear left row 20. Likewise, the front right row 18 is substantially symmetric about a line perpendicular to the direction of motion A with a rear right row 22. These general symmetries may involve some of the rows being offset relative to the others to achieve the indexing of the blades as described above.

When the plurality of rows of fluted-concave disc blades 14 are arranged in a symmetrical arrangement about the centerline 17, such as illustrated in FIG. 1, a gap between each side of symmetrical rows may be created. A center tilling member 23 may be placed in this gap to ensure that all the soil passing under the vertical tilling implement 2 is tilled as the tilling implement is pulled forward. The center tilling member 23 may be a coulter, as shown in FIG. 1, another fluted disc blade, or the like.

It should be observed that although FIG. 1 only shows four rows included in the plurality of rows of fluted-concave disc blades 14, there may be fewer or more rows of fluted-concave disc blades. Additionally, while the illustrated embodiment shows the plurality of rows of fluted-concave disc blades 14 having an x-shaped configuration based on the described symmetry, the plurality of rows of fluted-concave disc blades 14 may have a different configuration. For example, the plurality of rows of fluted-concave disc blades 14 may have a diamond configuration, a k-shaped configuration, or all may be parallel with each other in a direction perpendicular to the direction of motion A. Furthermore, it is contemplated that some or all of the rows may be configured in asymmetric arrangements.

It should be further observed that the rows may be at oriented at angles of about 18 degrees from a direction perpendicular to the direction of pull. As described above, known tillage implements utilizing typical smooth concave blades would not operate properly under such an aggressive angle and achieve satisfactory results. Historically, flat blades mounted in rows at this aggressive of an angle would break as a result of the massive side pressure of the soil as the tillage implement was pulled and would tend to leave large clods of soil that require a second tilling pass. However, in the disclosed embodiments, the fluted blades are unexpectedly capable of one-pass tilling at this aggressive gang angle despite only having a shallow concavity.

Rolling basket assemblies 24 are connected to the rear end of the main frame 4 to provide downward pressure. As will be described, the rolling basket assemblies 24 may be replaced with any other acceptable member that is capable of exerting a desired downward pressure, including additional rows of fluted-concave disc blades, and the like. Although FIG. 1 shows three rolling basket assemblies 24, two of which having rotational axes which are not collinear with the third, the rolling basket assemblies 24 may include fewer or more members providing downward force.

Because the rotation of the fluted-concave disc blades will induce vertical and lateral movement of the entire system, the inclusion of rolling basket assemblies 24 is critical to dampen the rear end of the main frame 4. When the vertical tilling implement 2 is pulled by the hitch 6, the main frame 4 is held down by the downward pressure provided by the rolling basket assemblies 24. This downward force will reduce and dampen the vertical and lateral movement of the main frame 4 induced by the rotation of the fluted-concave disc blades and their engagement with the soil.

Figure 2:
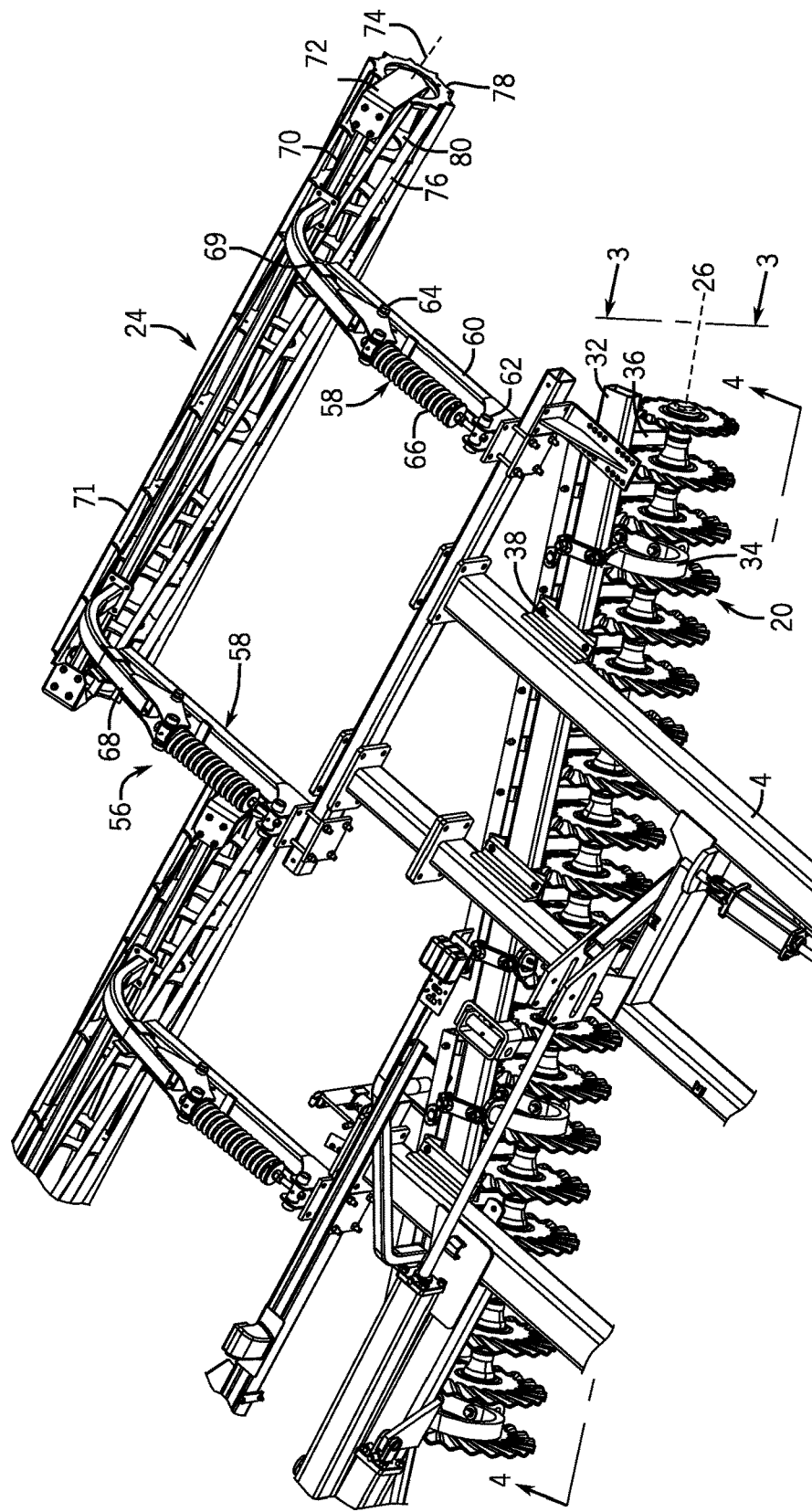
FIG. 2 is a detailed perspective view an embodiment of a portion of the present invention showing further detail of the rows of fluted-concave disc blades and rolling baskets.

Referring now to FIGS. 2, 3, and 4, detailed views of the rear left row 20 and the rolling basket assemblies 24 are shown. The rear left row 20, like the other rows in the plurality of rows of fluted-concave disc blades 14, is attached to the main frame 4. The rear left row 20 has a rotational axis 26 about which the fluted-concave disc blades are allowed to freely rotate. As shown, the rear left row 20, like the other rows in the plurality of rows of fluted-concave disc blades 14, also has a first half row 28 and a second half row 30. It should be appreciated that although a first half row 28 and a second half row 30 are shown, that different division of rows may exist. Also, there may be no division of the rows. The first half row 28 and the second half row 30 are attached to a row bar 32 by a set of u-shaped mounting brackets 34. A plurality of bars 36 extend down from the row bars 32 and between the discs to catch debris. The row bar 32 is connected to the main frame 4 using a set of brackets 38. The set of u-shaped mounting brackets 34 and the set of bars 36 may be somewhat elastic relative to the main frame 4 such that the each of the plurality of rows of fluted-concave disc blades 14 are permitted to be slightly displaced when the vertical tilling implement 2 is in use.

Referring now to FIGS. 3 and 4, a side view of the rear left row 20 is shown. This end view of the rear left row 20 illustrates both the features of an individual fluted-concave disc blade as well as the comparative diameters of the fluted-concave disc blades relative to one another. A first blade 40 is located on the end of the rear left row 20. The first blade 40 is permitted to freely rotate around an axle 42 that is aligned along rotational axis 26. The first blade 40 has a flat center portion 44 and a series of crests and troughs 46, as shown, extending a-radially inward from the outer periphery of the first blade 40. The series of crests and troughs 66 forms, a plurality of flutes 48.

Also connected to axle 42 are a second blade 50, a third blade 52, a fourth blade 54, and a number of other blades which may have similar surface features as the first blade 40. As shown in FIG. 4, the blades are arranged such that blades with the smallest diameter, in this case the first blade 40, are positioned on the outermost position in the rear left row 20. The second blade 50, which has a larger diameter than first blade 40 is positioned in the second outermost position in the rear left row 20. Continuing inward, the third blade 52 and the fourth blade 54 are also connected to the axle 42. Both the third blade 52 and the fourth blade 54 have a greater diameter than the second blade 50. However, as shown, the third blade 52 and the fourth blade 54 have similar diameters as do all subsequent blades further positioned down the rear left row 20.

Although the disclosed embodiment only shows three different blade diameters, it should be appreciated that the number of blades having different diameters may vary. Additionally, the disclosed embodiment only shows a configuration in which the blade diameters decrease and then remain uniform across the row. However, other configurations of blades are possible and this disclosure is not intended to limit the invention to a particular configuration of blades.

Furthermore, it should be appreciated that the manner in which the blades are organized in the rear left row 20 may mirror the manner in which the blades are organized in rear right row 22. Likewise, the front left row 16 and the front right row 18 may exhibit similar organization to the rear rows. Also, organization among and between the rows may vary.

As discussed above, the blades in the rows may be indexed to improve the uniformity of the tilling. The blade diameters and blade locations along the axles may be indexed to optimize the performance of the vertical tilling implement 2 as it is pulled. Based on the angles at which each of the rows of fluted-concave disc blades are positioned, it may be desirable to alter the spacing and diameters of the blades located along each row. The blades can be arranged on the rows such that the blades in the rear rows 20 and 22 will engage any soil that was not engaged by the blades in the front rows 16 and 18. Commonly, this can be achieved by offsetting the blades in the front rows 16 and 18 relative to the rear rows 20 and 22 by one-half of the blade-to-blade distance.

It should be appreciated that although the crests and troughs are shown as a-radially extending inward from the outer periphery of the fluted-concave disc blades, that the crests and troughs may also extend radially towards the center of the blade. Put another way, each of the flutes has a crest and an adjacent valley at the outer periphery, with each crest and adjacent valley extending back from the outer periphery in respective adjacent lines. These lines may either be disposed at a predetermined acute angle with respect to the radius or be disposed radially.

Moreover, the plurality of flutes 48 permit the vertical tilling implement 2 effectively till soil at tilling depths of only 2 inches, whereas the known tilling implements would need to engage the soil at depths of 3 to 6 inches to effective till the soil. The a-radial nature of the plurality of flutes 48 may tend to pick up larger swaths of soil than normal concave blades. Additionally, fluted-concave disc blades with a shallow concavity of 1.25 to 1.69 inches till a wider width of soil than smooth disc blades with the same concavity. Thus, the fluted-concave disc blades are capable of achieving a sufficiently thorough width of till to depths exceeding the depth of the fluted-concave disc blades' engagement with the soil. It should be appreciated that this phenomenon also can be used to reduce the amount of side pressure that the soil will exert on the blades, given the blades reduced engagement depth with the soil. Additionally, the rolling basket assemblies 24 can help to break up any large clods of soil that remain as the result of the aggressive gang angles.

It should also be appreciated that the surface of the blade can optionally include surface scoring. The scoring can be roughly aligned with the radial or a-radial orientation of the plurality of flutes 48 as described in the above paragraph.

Moreover, it should be appreciated that the fluted-concave disc blades are concave. Even at shallow concavities between 1.25 and 1.69 inches, the fluted-concave disc blade will not fail like the known disc blades even at steep gang angles approaching 18 degrees. These shallow concavities, coupled with the plurality of flutes 48, permit the fluted-concave disc blades to operate without the formation of a subsoil compaction layer.

Referring back to FIG. 2, the rolling basket assemblies 24 are connected to the main frame 4 by an adjustable pressure assembly 56. The adjustable pressure assembly 56 includes a set of arms 58 extending rearwardly from the main frame 4 and downwardly to engage the rolling basket assemblies 24. The set of arms 58 includes a pair of fixed beams 60 which have a set of spring connection points 62 positioned frontwardly on the fixed beams 60 and a set of links 64 that is hingedly connected to the fixed beams 60 near the midpoints of the fixed beams 60. A set of springs 66 run between the set of spring connection points 62 and the set of links 64. The set of links 64 also connect in the rearward direction to a set of L-shaped bars 68. The set of L-shaped bars 68 are positionally adjustable but are also connected to and restricted in movement by a pair of slide bearings 69 located on the set of fixed beams 60 at a point near the rearward ends of the set of fixed beams 60.

The adjustable pressure assembly 56 applies a downward force on the rolling basket assemblies 24. The set of springs 66 may be selected to apply a desired force on the set of links 64. This force will cause the set of links 64 to rotate about their hinged connections to the fixed beams 60 such that the set of L-shaped bars 68 exert more or less downward force into the rolling basket assemblies 24.

The rolling basket assemblies 24 includes a frame 70 extending between the set of arms 58 and about the ends of a rolling basket 71. To this end, the frame 70 engages the rolling basket 71 through a rotational coupling 72, such that the rolling basket 71 is capable of rotating about a rotational axis 74. Although multiple rolling basket assemblies 24 are not required, in the case where there are multiple rolling basket assemblies 24, their respective rotational axes, as illustrated, may be non-collinear. However, it is contemplated that in some applications, it may be desirable for the rotational axes to be collinear.

The rolling basket 71 is formed by a plurality of bars 76 that extend between end caps 78 and around a set of supporting framework rings 80. The end caps 78 engage the rotational coupling 72 to allow the rolling basket assemblies 24 to rotate. As illustrated, it is contemplated that the plurality of bars 76 may have a helical configuration, such that the plurality of bars 76 twist around the cylindrical face of the rolling basket assemblies 24. However, in some configurations, straight or other varied arrangements may be utilized. The plurality of bars 76 may have flat or rounded surfaces. In the illustrated configuration, the plurality of bars 76 have flat surfaces and a square-shaped cross-section. Furthermore, the plurality of bars 76 are mounted between the end caps 78 such that the outermost edge of the diameter of the rolling basket assemblies 24 are the sharp corners of the plurality of bars 76. As such, as the rolling basket assemblies 24 rotate, a sharp corner is designed to impact the ground surface and, thereby, penetrate, and preferably, explode, the clumped soil and/or residue.

When the vertical tilling implement 2 is pulled in a direction of movement A, the plurality of rows of fluted-concave disc blades 14 are pulled though the soil. These fluted-concave disc blades engage the soil to a tilling depth that is typically 2 inches or less. The fluted-concave disc blades move the soil in a direction both lateral to the blades as well as up. An a-radial orientation of the series of crests and troughs 46 and the plurality of flutes 48 can improve the movement of the soil in both the vertical direction as well as the lateral direction. As the soil passes under the vertical tilling implement 2, it is first engaged by the front left row 16 and front right row 18. Next, it is engaged by the rear left row 20 and the rear right row 22. The center tilling member 23 will till soil that would not otherwise be tilled because it is located in the gap between the plurality of rows of fluted-concave disc blades 14. If large soil clumps become stuck between two adjacent blades, the set of bars 36 will assist in dislodging the large soil clumps and knocking the large soil clumps off of the blades. Finally, the soil passes under the rolling basket assemblies 24 having helical rolling bars 76. The rolling basket 71 rotates and the edge of the plurality of bars 76 act to both crush the remaining large chunks of earth as well as to level the soil.

Because the blades have flutes, the vertical tilling implement 2 has a tendency to move back and forth laterally and up and down vertically as is pulled forward by the tractor. This problem is alleviated in two ways. First, the set of pivoting wheels 12 act to stabilize the side-to-side motion of the vertical tilling implement 2. Second, the downward force applied by the adjustable pressure assembly 56 through rolling basket assemblies 24 inhibits the side-to-side and up-and-down motion of the vertical tilling implement 2. The downward force on the rolling basket assemblies 24 in conjunction with the forward force applied by the tractor pulling hitch 6 will have the effect of putting the vertical tilling implement 2 in a state of tension from front to back. This tension will generally inhibit the amount of vertical and lateral movement that the vertical tilling implement 2 experiences.

Figure 5:
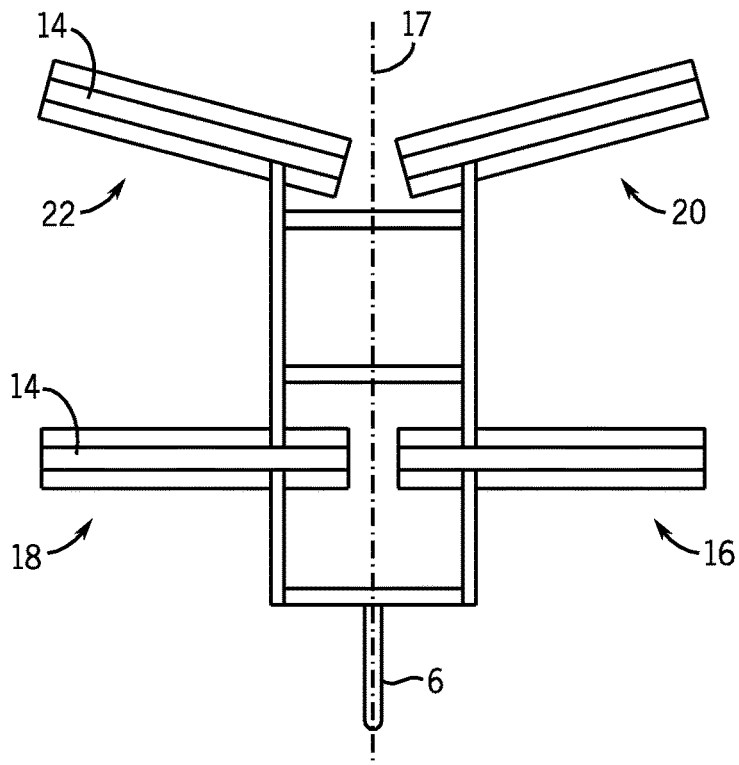
FIG. 5 is a top view of a schematic illustrating an embodiment of fluted concave disc blades in a k-shaped formation.
Figure 6:
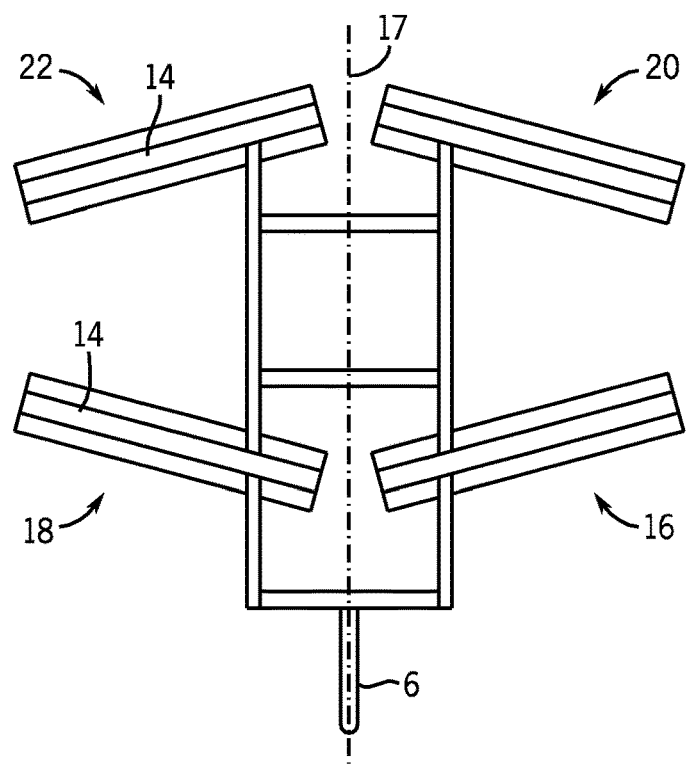
FIG. 6 is a top view of a schematic illustrating an embodiment of fluted concave disc blades in a diamond shaped formation.

FIG. 5 is a top view of a schematic illustrating an embodiment of the vertical tilling implement 2, including rows of fluted concave disc blades in a k-shaped formation. FIG. 6 is a top view of a schematic illustrating an embodiment of the vertical tilling implement 2, including rows of fluted concave disc blades in a diamond shaped formation.

The overall configuration of the system also serves to dampen the vibration and permit increased operational speeds of up to approximately 10 miles per hour. The combination of the design of the blades, the angle of the rows, and the flexible nature of the u-shaped mounting brackets 34 and the adjustable pressure assembly 56 permits the vertical tilling implement 2 to be pulled at speeds over 10 mph The present invention has many unexpected and unpredicted advantages. First, the use of fluted-concave disc blades in the tilling implement permits the use of more aggressive gang angles without resulting in increased disc failures or the generation of large clumps of soil requiring multiple passes. Second, while the known tilling implements need to engage the soil to a depth of 3 to 6 inches to properly till the soil and leave a level surface, the vertical tilling implement is capable of performing achieving a similar quality of till with soil engagement of 2 inches or less. Third, unlike known tilling implements, the vertical tilling system is capable of having gangs mounted at an aggressive angle (about 18 degrees), but has discs with only a shallow concavity and will not result in the formation of a compaction layer. Fourth, the vertical tilling system is capable of traveling at greater speeds than the known tilling systems having freely-rotatable disc. While other tilling implements can not be pulled at speeds of more than 6 miles per hour without disengaging the soil or causing disc blade failure, the disclosed vertical tilling system is capable of being pulled at speeds greater than 10 miles per hour.

A preferred embodiment of the invention has been described in considerable detail. Many modifications and variations to the preferred embodiment described will be apparent to a person of ordinary skill in the art. Therefore, the invention should not be limited to the embodiment described.

The invention claimed is:

1. A tilling implement, comprising:
a front row of disc blades coupled to a main frame and having a front right portion and a front left portion;
a rear row of disc blades coupled to the main frame and having a rear right portion and a rear left portion, the rear right portion following behind the front right portion and the rear left portion following behind the front left portion when the tilling implement is displaced through a field, wherein at least a portion of the disc blades of the front row, at least a portion of the disc blades of the rear row, or a combination thereof, comprises fluted-concave disc blades having a concavity of 1.25 to 1.69 inches;
a pair of wheels, each positioned forward of the main frame along a direction of travel, and proximate to a respective laterally outward end of the front row of disc blades, wherein the pair of wheels is configured to reduce motion of the main frame perpendicular to the direction of travel caused by the fluted-concave disc blades rotatably engaging the soil;
at least one member providing downward pressure, the at least one member attached to the main frame at a position proximate to a rear end of the main frame relative to a position of the disc blades and exerting a downward pressure that reduces and dampens the motion of the main frame caused by the fluted-concave disc blades rotatably engaging the soil;
wherein the tilling implement includes no ground engaging tilling tool mounted between the front right portion and the rear right portion, and no ground engaging tilling tool mounted between the front left portion and the rear left portion; and
wherein all ground engaging tilling tools disposed on the tilling implement are configured to rotate in operation.

2. The tilling implement of claim 1, wherein each disc blade of the front row comprises a fluted-concave disc blade.

3. The tilling implement of claim 1, wherein each disc blade of the rear row comprises a fluted-concave disc blade.

4. The tilling implement of claim 1, wherein the at least one member providing downward pressure includes a rolling basket.

5. The tilling implement of claim 4, wherein the rolling basket includes helically twisted bars.

6. The tilling implement of claim 1, wherein the front left portion and the front right portion are angled symmetrically with respect to a line perpendicular to a centerline of the tilling implement.

7. The tilling implement of claim 6, wherein the front left portion and the front right portion are positioned at an angle of about 18 degrees with respect to the line perpendicular to the centerline.

8. The tilling implement of claim 1, wherein the disc blades of the front row are arranged in at least one gang, and the disc blades of the rear row are arranged in at least one gang.

9. The tilling implement of claim 1, wherein the disc blades include a plurality of diameters, and wherein the disc blades having the smallest of the plurality of diameters are arranged on the front and rear rows at ends farthest from a centerline of the tilling implement.

10. The tilling implement of claim 1, wherein the rear left portion and the rear right portion are angled symmetrically with respect to a line perpendicular to a centerline of the tilling implement.

11. The tilling implement of claim 10, wherein the rear left portion and the rear right portion are positioned at an angle of about 18 degrees with respect to the line perpendicular to the centerline.

12. The tilling implement of claim 1, wherein the front left portion and the front right portion and the rear left portion and the rear right portion are angled symmetrically with respect to a centerline of the tilling implement.

13. A tilling implement, comprising:
a front row of disc blades coupled to a main frame and having a front right portion and a front left portion, wherein the front right portion extends across a right tilling path, and the front left portion extends across a left tilling path;
a rear row of disc blades coupled to the main frame and having a rear right portion and a rear left portion, the rear right portion following behind the front right portion in the right tilling path and the rear left portion following behind the front left portion in the left tilling path when the tilling implement is displaced through a field, wherein at least a portion of the disc blades of the front row, at least a portion of the disc blades of the rear row, or a combination thereof, comprises fluted-concave disc blades having a concavity of 1.25 to 1.69 inches;
a pair of wheels, each positioned forward of the main frame along a direction of travel, and proximate to a respective laterally outward end of the front row of disc blades, wherein the pair of wheels is configured to reduce motion of the main frame perpendicular to the direction of travel caused by the fluted-concave disc blades rotatably engaging the soil;
at least one member providing downward pressure, the at least one member attached to the main frame at a position proximate to a rear end of the main frame relative to a position of the disc blades and exerting a downward pressure that reduces and dampens the motion of the main frame caused by the fluted-concave disc blades rotatably engaging the soil;
wherein the tilling implement includes no ground engaging tilling tool between the front right portion and the rear right portion, and no ground engaging tilling tool between the front left portion and the rear left portion; and
wherein each ground engaging tilling tool in the right tilling path and each ground engaging tilling tool in the left tilling path is configured to rotate in operation.

14. The tilling implement of claim 13, wherein the front left portion, front right portion, rear left portion and rear right portion are angled symmetrically with respect to a line perpendicular to a centerline of the tilling implement.

15. The tilling implement of claim 14, wherein the front left portion and the front right portion are positioned at an angle of about 18 degrees with respect to the line perpendicular to the centerline.

16. The tilling implement of claim 13, wherein the front and rear rows of disc blades are spatially arranged to form an x-shaped pattern, the front and rear rows of disc blades are spatially arranged to form a k-shaped pattern, or the front and rear rows of disc blades are spatially arranged to form a diamond-shaped pattern.

17. The tilling implement of claim 13, wherein each disc blade of the front row comprises a fluted-concave disc blade.

18. The tilling implement of claim 13, wherein each disc blade of the rear row comprises a fluted-concave disc blade.

19. A tilling implement, comprising:
a front row of disc blades coupled to a main frame and having a front right portion and a front left portion, wherein the front right portion extends across a right tilling path, and the front left portion extends across a left tilling path;
a rear row of disc blades coupled to the main frame and having a rear right portion and a rear left portion, the rear right portion following behind the front right portion in the right tilling path and the rear left portion following behind the front left portion in the left tilling path when the tilling implement is displaced through a field, wherein at least a portion of the disc blades of the front row, at least a portion of the disc blades of the rear row, or a combination thereof, comprises fluted-concave disc blades having a concavity of 1.25 to 1.69 inches;
a pair of wheels, each positioned forward of the main frame along a direction of travel, and proximate to a respective laterally outward end of the front row of disc blades, wherein the pair of wheels is configured to reduce motion of the main frame perpendicular to the direction of travel caused by the fluted-concave disc blades rotatably engaging the soil;
at least one member providing downward pressure, the at least one member attached to the main frame at a position proximate to a rear end of the main frame relative to a position of the disc blades and exerting a downward pressure that reduces and dampens the motion of the main frame caused by the fluted-concave disc blades rotatably engaging the soil;
wherein the tilling implement includes no ground engaging tilling tool mounted between the front right portion and the rear right portion, and no ground engaging tilling tool mounted between the front left portion and the rear left portion; and wherein each ground engaging tilling tool mounted in the right tilling path and each ground engaging tilling tool mounted in the left tilling path is configured to rotate in operation.

20. The tilling implement of claim 19, wherein the at least one member providing downward pressure includes a rolling basket.

\* \* \* \* \*